United States Patent [19]

Golston

[11] 4,172,037
[45] Oct. 23, 1979

[54] CONTINUOUS PROCESS DIFFUSER

[75] Inventor: Stefan Golston, Bellevue, Wash.

[73] Assignee: Kamyr Inc., Glens Falls, N.Y.

[21] Appl. No.: 621,561

[22] Filed: Oct. 10, 1975

[51] Int. Cl.² .................... D21D 5/02; B01D 33/00
[52] U.S. Cl. ........................... 210/315; 68/181 R;
210/342; 210/347
[58] Field of Search ......... 68/181 R; 210/315, 323 T, 210/342, 345, 347, 456

[56] References Cited

U.S. PATENT DOCUMENTS

| | | | |
|---|---|---|---|
| 1,771,928 | 7/1930 | Jung | 210/315 X |
| 2,540,362 | 2/1951 | Winslow et al. | 210/323 T X |
| 3,348,390 | 10/1967 | Richter | 68/181 R |
| 3,372,087 | 3/1968 | Richter | 210/342 X |
| 3,491,886 | 1/1970 | Glos et al. | 210/347 X |
| 3,599,449 | 8/1971 | Richter | 68/181 R |
| 3,815,386 | 6/1974 | Gullichsen et al. | 68/181 R |

*Primary Examiner*—Robert H. Spitzer
*Attorney, Agent, or Firm*—Cushman, Darby & Cushman

[57] ABSTRACT

An assembly for treating pulp and the like in a vessel by directing an axial flow of bleaching or washing liquid or the like through the pulp, and immediately thereafter removing the spent liquid from the pulp by a straining assembly. The straining assembly includes a plurality of concentric ring-like screens having radially spaced perforated or slotted side plates, a plurality of concentric ring-like headers corresponding in number to the screens and connected to the screens in end-to-end fluid communicating relationship, and a plurality of radially extending axially reciprocal arms. Liquid passing through the screens flows through the headers and through the arms out of the vessel under the influence of pressure differential. The headers are connected to the arms and the arms are connected to the headers by structures which provide bending and torsional rigidity of the straining assembly, and which minimize the adverse effects of non-synchronous operation of actuators for axially moving the straining assembly. Uniformity of pulp treatment is maximized by provision of the headers.

12 Claims, 6 Drawing Figures

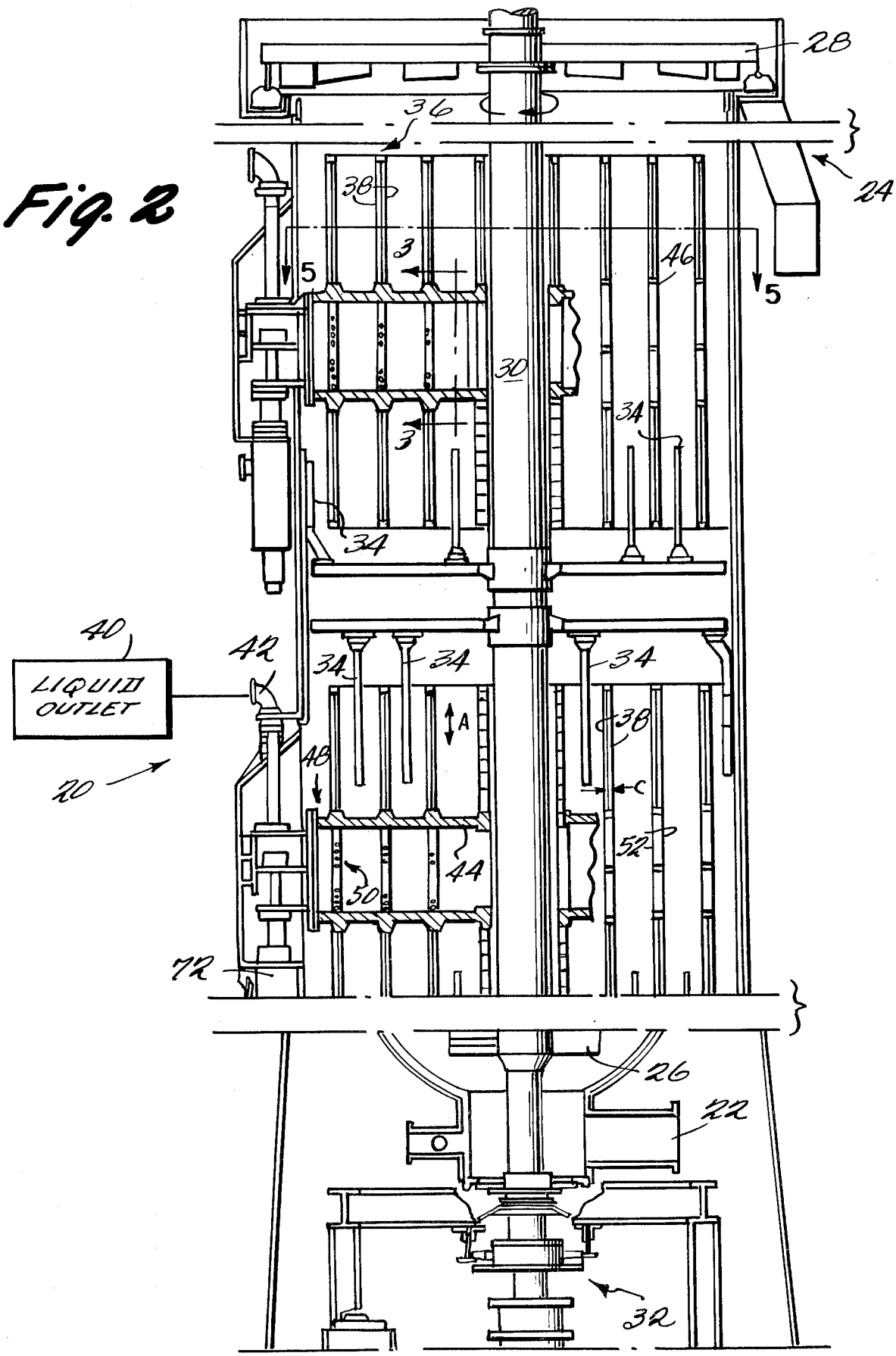

CONTINUOUS PROCESS DIFFUSER

BACKGROUND AND SUMMARY OF THE INVENTION

The invention relates to the provision of a straining assembly in a vessel for the treatment of pulp or the like. In continuous process treatment of cellulose for producing pulp, apparatus is provided at various stages (i.e. bleaching and washing) of the treatment for introducing a treatment liquid axially into the pulp, and then immediately thereafter removing the treatment liquid from the pulp after it has been spent. Conventional apparatus for this treatment is shown in U.S. Pat. Nos. 3,348,390, 3,372,087, 3,563,891, 3,599,449, 3,704,603, 3,760,948 and 3,815,386. While prior art structures have been generally successful and practical in performing such treatments, problems of fatigue of the prior art apparatus have been encountered, resulting both from the constant up and down movement imparted to the screen-assemblies in the prior art (to dislodge pulp sticking to the screens) and the non-synchronous operation of hydraulic cylinders or the like for performing such up and down movement, and problems of uneven treatment of the pulp have been encountered in large vessels and where a large volume of pulp per unit time is being treated.

According to the present invention, failure of the component parts due to fatigue of the strainer assembly is avoided despite constant up and down movement thereof, and even treatment of the pulp with bleaching or washing liquid or the like is provided even in large vessels and for large pulp volumes per unit time. According to the present invention, each of the ring-like concentric screens is connected to a ring-like header, side plates of the screen and header being disposed in end-to-end relationship. The header plates are solid and spaced about the same radial distance as the screen plates are spaced. Means, such as a perforated rigid ring member having substantially the same width as the distance between screen plates, are provided for connecting each header and screen together in fluid communicating relationship. Means for providing torsional and bending stiffness and for providing fluid communication are also provided for attaching each header to radially extending arms of the assembly. These means include a pair of torsion bars forming part of the header, one disposed on either side of spaced side plates of the arm, and means (i.e. welds) for connecting the torsion bars to top and bottom portions of the arm. Perforations formed in the torsion bars and in the arm side plates adjacent thereto are provided for providing fluid communication between the arms and headers.

According to the present invention, only three radially extending arms and axial movement actuators therefor need be provided for support and movement of the assemblies, rather than a larger number which are often necessary in prior art devices. The provision of three radially extending arms minimizes the stresses that may be imparted to the assembly as the result of slightly non-synchronous operation of the hydraulic cylinders associated with arm. Also, more uniform pulp treatment is provided since liquid passing through a screen may flow directly downwardly (or upwardly) from any point therealong, rather than being forced to first travel arcuately—the effect of pressure differential provided along the arcuate lengths of the screens results in flow of liquid more uniform according to the present invention because of the provision of the headers.

It is the primary object of the present invention to provide an improved cellulose pulp or the like treatment assembly for large volume vessels and high volume/unit time treatment. This and other objects of the invention will become clear from an inspection of the detailed description of the invention, and from the appended claims.

BRIEF DESCRIPTION OF THE DRAWINGS

FIG. 1b is a plan view of the prior art diffuser of FIG. 1a;

FIG. 2 is a cross-sectional view partly in elevation of an exemplary pulp-treating assembly according to the present invention;

DETAILED DESCRIPTION OF THE INVENTION

Figure 1A:
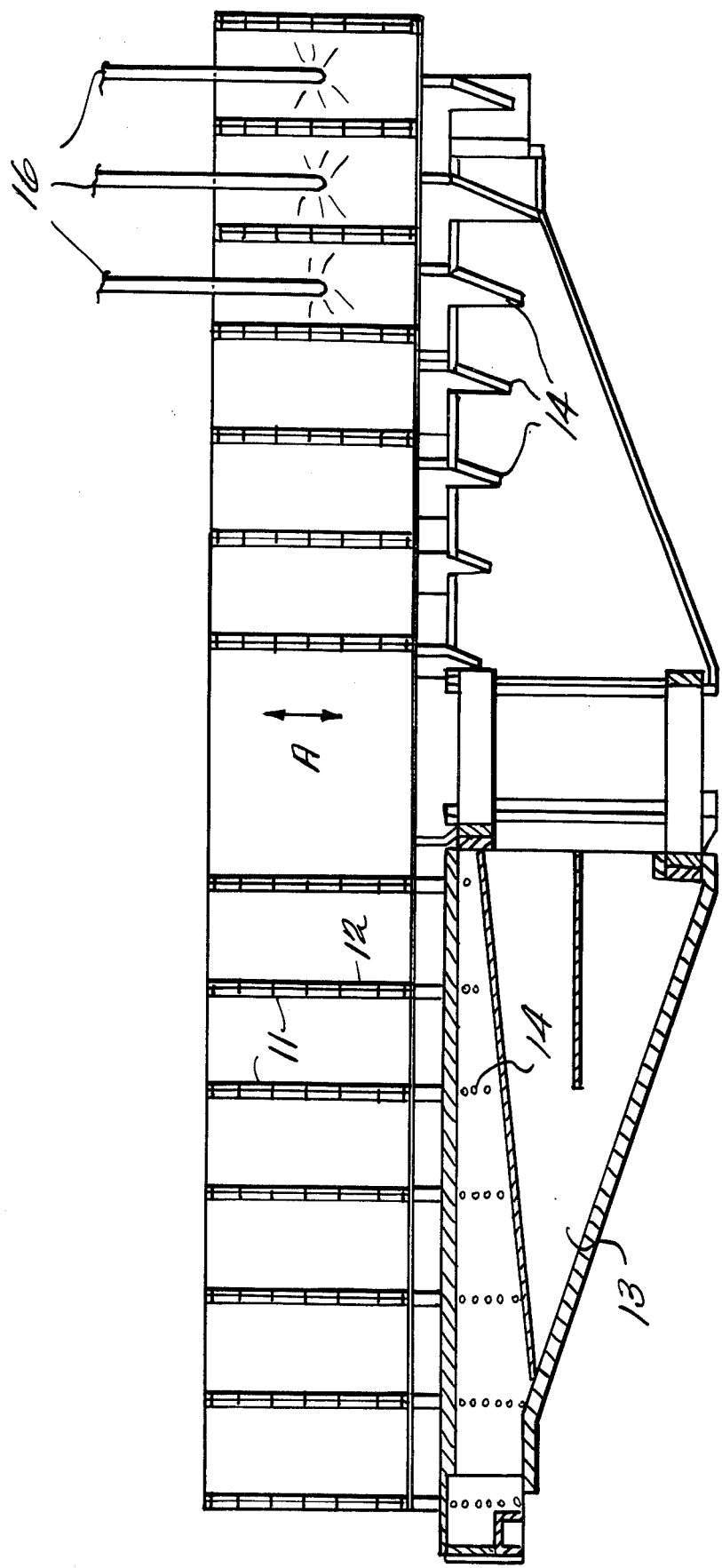
FIG. 1a is a side view partly in cross-section of a typical prior art diffuser screen and arm arrangement.
Figure 1B:
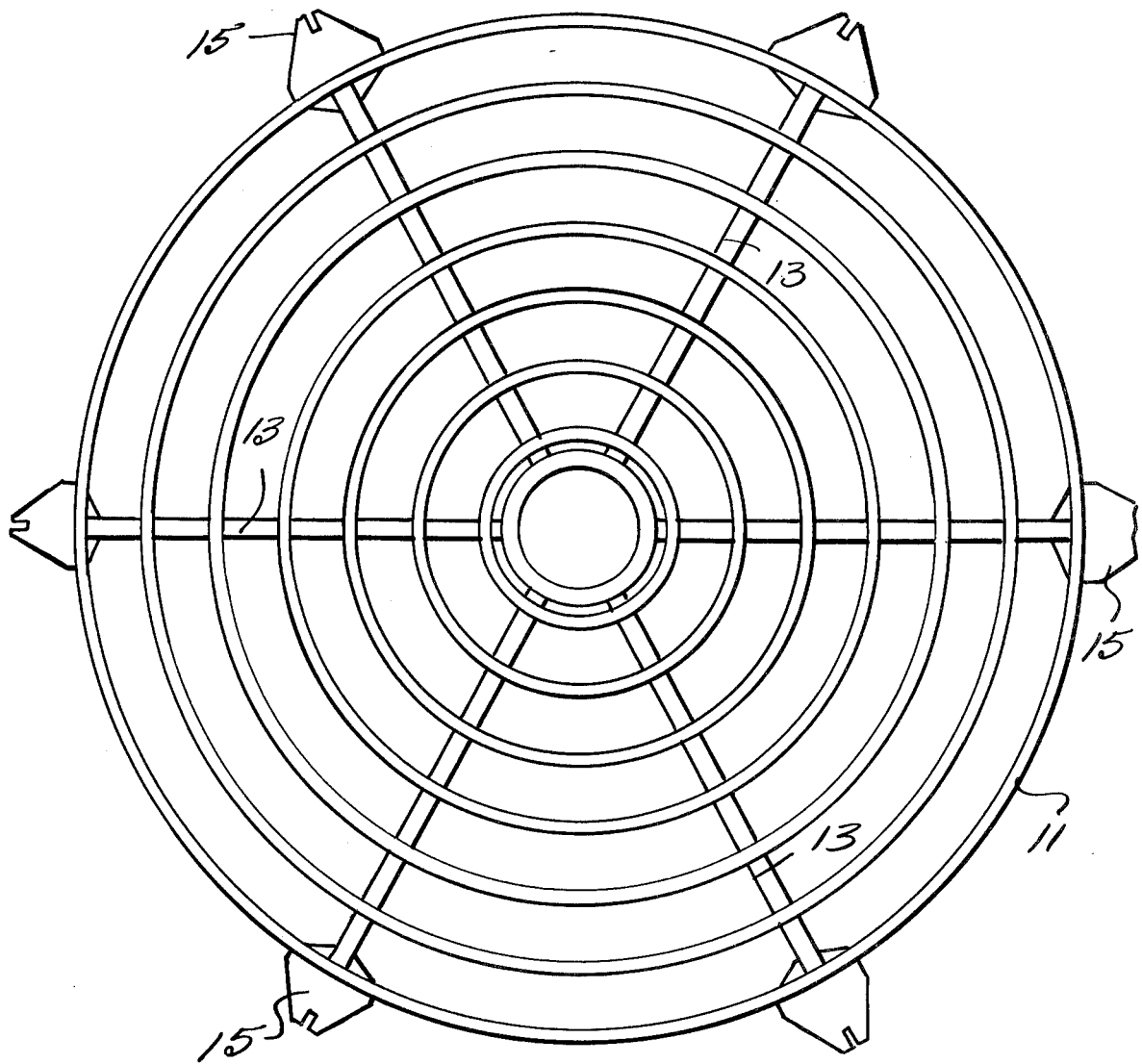
Figure 3:
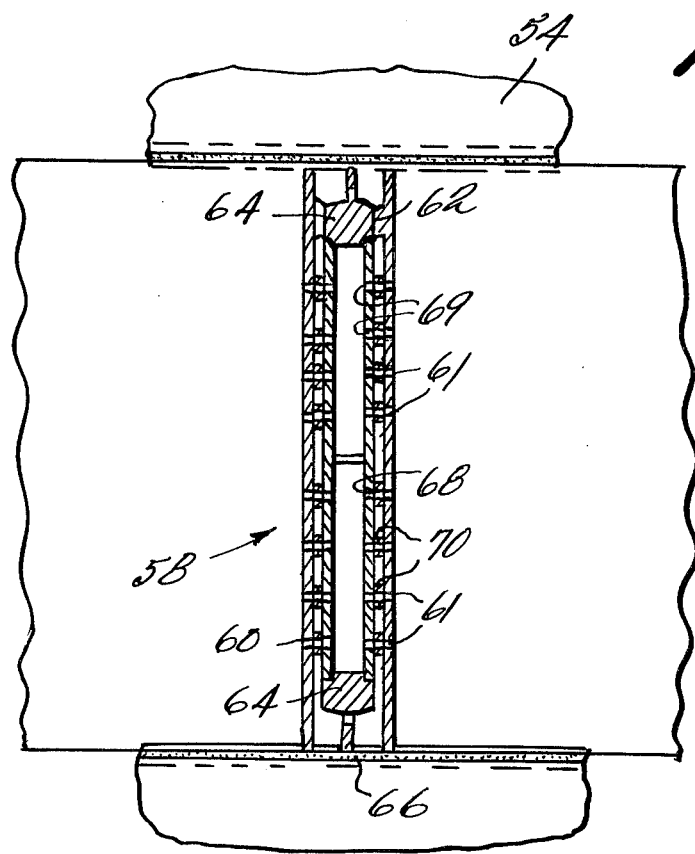
FIG. 3 is a detail view taken along lines 3—3 of FIG. 2.
Figure 4:
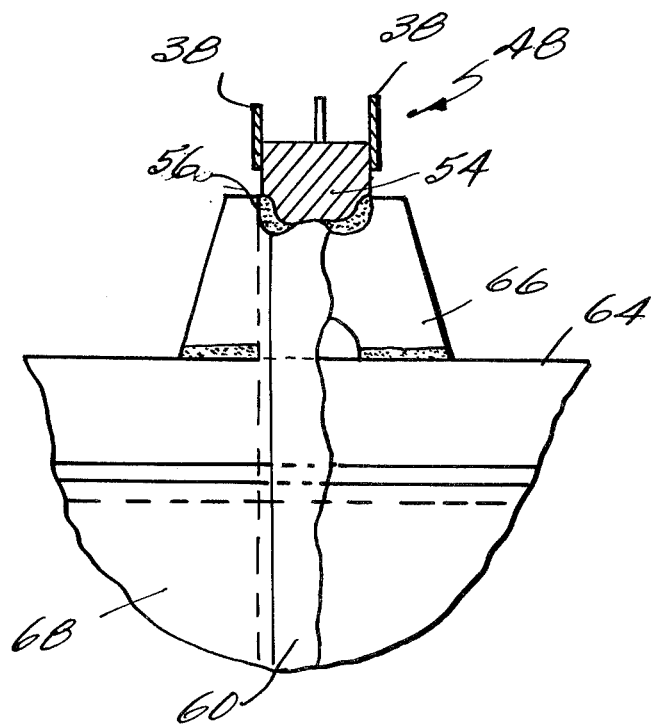
FIG. 4 is a detail view of the structure of FIG. 3 rotated 90°.

In the treatment of cellulose pulp or the like, such as in continuous bleaching or washing thereof, assemblies are provided for axially directing bleaching or washing agents and the like in a column of pulp to be treated, and for shortly thereafter straining the agents from the pulp. Typical prior art devices for performing such operations are disclosed in U.S. Pat. Nos. 3,348,390, 3,372,087, 3,563,891, 3,599,449, 3,704,603, 3,760,948 and 3,815,386, and are illustrated in FIGS. 1a and 1b of the drawings. With reference to FIGS. 1a and 1b, a typical prior art device includes a plurality of ring-like screens 11 having hollow interiors 12 and in fluid communication with a plurality (i.e. six) of radially extending arms 13. The screens 11 are usually attached to the arms 13 by funnels 14 or the like, and each of the arms is reciprocal in the axial direction A by a reciprocating means, such as hydraulic cylinders 15. During treatment, bleaching or washing liquid or the like is radially directed into a column of axially moving pulp by rotatable spray tubes 16 or the like, and the liquid flows through the pulp to the screens 11 (whereat the pulp is screened out), and then passes out through the arms 13. The screen-arm assembly 11, 13 is slowly moved upwardly by the cylinders 15 until it reaches its upwardmost position, and then is moved rapidly downwardly to dislodge pulp that may have become clogged in the screen openings.

While the prior art device disclosed in FIGS. 1a and 1b is very useful and generally effective, under some circumstances it is desirable to have a structure fatigue life of which is longer and independent on certain inaccuracies in functioning of the hydraulic system actuating the motion, and to have a design that provides a more even treatment of the pulp with the bleaching or washing liquid or the like. After extended operation of the device of FIGS. 1a and 1b, there is a tendency for the connections between the screens 11 and arms 13 to be subject to fatigue, with resultant failure, the portions of the rings between arms being subjected to twisting torque and bending during the up and down movements of the screen-arm assembly. Additionally, since six arms are usually provided for large installations, and since it is very difficult to attain and continuously maintain exactly synchronous operation of the hydraulic cylinders 15 moving the assembly up and down, warpage of the assembly can result. On the other hand if the number of arms was reduced to three so that this problem would be alleviated (the shape of an elastic object supported at three points does not depend on the exact leveling of the supports), the other above-mentioned fatigue problems would be aggravated. Also, during operation of the device of FIGS. 1a and 1b, the efficiency of extraction of the liquid from the pulp—which depends upon the pressure differential of the liquid within and without the screens 11 and arms 13, varies with the arcuate distance B of a given screen point from the funnels 14, the extraction being more efficient in the vicinity of the arms and least in the area of screen between the arms.

Figure 5:
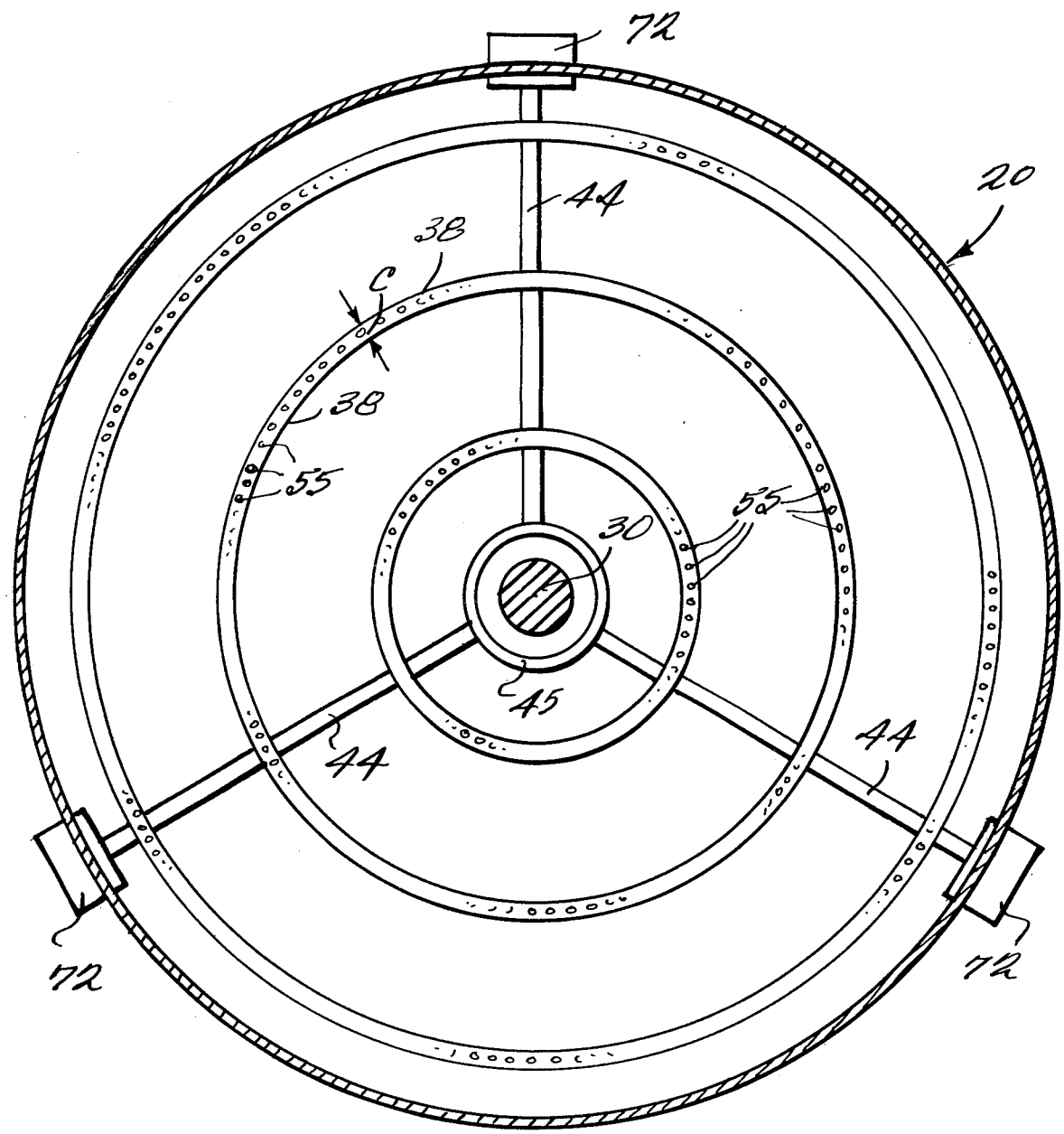
FIG. 5 is a top view taken along lines 5—5 of FIG. 2.

The apparatus of the present invention, as exemplified in FIGS. 2-5, is useful in situations where the treatment vessel is very large and for high volume treatment, and according to the present invention fatigue failure is greatly reduced, the number of radially extending arms may be reduced to three so that exactly synchronous operation of the hydraulic cylinders is not as essential, and the extraction of liquid is more uniform over the screen areas so that more even treatment of the pulp results. Apparatus according to the present invention, as shown in FIGS. 2 and 5 in particular, includes a treatment vessel 20 which is vertically extending, having a pulp inlet 22 at the bottom thereof, and a pulp outlet 24 at the top thereof. The pulp moves gradually up the vessel 20 under pressure from the inlet 22, to the outlet 24, and a mixer 26 may be provided near the inlet 22 to insure an even upflow without packing. A rotary shaft 30 may be disposed interiorly of the vessel 20 for rotation of the scrapers 26 and 28; any suitable power means, such as motor drive 32, may be utilized for rotating the shaft 30.

As the pulp moves upwardly in the vessel 20, it is treated at various positions along the height of the vessel by bleaching or washing liquid or the like which is introduced by the rotary sprayers 34. The sprayers 34 spray the liquid generally radially, and as the liquid acts on the pulp and the action thereof is diminished, it is extracted through the concentric ring-like screens 36, and withdrawn from the vessel 20 for disposal or recharging. The sprayers 34 may be rotated by the shaft 30, or by another suitable rotating means.

Each of the screens 36 consists of a pair of side plates 38 that are radially spaced from each other a small distance C (e.g. 2½ inches). Preferably both of the side plates 38 are perforated or slotted, although only one need be. Pressure differential between the exterior of the screen 36 and the outlet pipes, connected to elbow 42, or the like, is effective in causing the flow of liquid extracted from pulp through screens 36 into the header 46, then into the arms 44 and through elbow 42, or similar device into outlet pipes. The arms 44 extend radially from a central core 45 or the like of vessel 20. According to the present invention, means are provided for connecting the screens 36 to the radially extending arms 44 that provide for long-life of the assembly—developing very low operating stresses and therefore not being susceptible to fatigue—despite rapid and constant up-and-down movements of the assembly. The connecting means according to the present invention generally comprise a plurality of concentric ring-shaped headers 46 corresponding in number to the number of ring-shaped screens, the correspondence being two screen rings or one screen ring to one header ring, as required, attaching means 48 for attaching the headers and screens together, and attaching means 50 for attaching the arms and headers together.

Each of the headers 46 has a pair of arcuate solid side plates 52 or the like that are radially spaced from each other approximately the same distance C that the screen 36 side plates 38 are spaced from each other, and each of the header side plates extends axially a distance which may be chosen depending upon the treatment parameters (e.g. it may be the same as the axial distance the side plates of the screens 36 extend, typically 3 to 4½ ft.). The headers 46 are attached to the screens 36 in end-to-end fluid communicating relationship by any suitable means, such as a ring member 54 (see FIG. 4 in particular) having a width corresponding to the spacing C between side plates of the screen 36 and header 46 respectively. The side plates 38, 52 of the screen 36 and header 46 may be welded to the ring member 54, as at points 56. Fluid communication between the screen 36 interior and the interior of the header 46 is provided by a plurality of openings 55 or the like formed in the ring member 54. It will be seen that according to the present arrangement, since a header 46 is disposed directly beneath or above every portion of each screen 36, it is not necessary for fluid flowing into a portion of a screen 36 to travel an arcuate distance B as is necessary in the prior art structure shown in FIGS. 1a and 1b, but rather it must just pass straight downwardly (or upwardly) into the header 46. While the liquid must travel a longer axial distance and eventually travel an arcuate distance to get to a radially extending arm 44, a more even pressure differential is provided along the arcuate length of the screens since the side plates 52 of the header are solid. Therefore, a more even and efficient transfer of liquid into the screens may be provided according to the present invention.

Attachment of the headers 46 to the radially extending arms 44 is provided by attachment means 58 or the like for providing bending and torsional stiffness of the assembly and for providing fluid communication between the header 46 and screen 36. The attachment means 58, as shown most clearly in FIGS. 3 and 4, generally comprises a pair of torsion bars 60 at each header-arm interface. Each torsion bar 60 is part of the header structure and is rigidly attached—as by welds 62—to top and bottom portions 64 of the arm 44 respectively. Optionally, an additional short fitting 66 may be provided disposed between the torsion bars 60 and attached to the top or bottom portions 64 and the ring member 54 connecting the header 46 to the screen 36. Fluid communication between the header 46 and arm 44 is provided by a plurality of openings 61 formed in the torsion bars 60 and a plurality of openings 69 formed in the side walls 68 of the arm 44 at the area thereof which is received by the header 46. Connecting tubes 70 or the like between openings 61 and 69 may be provided if desired (see FIG. 3). The above-described attachment of the screens 36 to the radially extending arms 44 provides a much stronger connection than is provided by prior art structures, such as the funnels 14 of the FIGS. 1a and 1b prior art device, and such an arrangement will have a much longer life. This is due in part to the high moment of inertia of the present assembly, and the fact that the pair of reaction forces to the torsional movement of the screen and the arm act one at the top of the arm (top portion 64) and one at the bottom of the arm (bottom portion 64), thus effectively diminishing the magnitude of the reaction force. Overall the whole assembly has a stronger inherent configuration.

Each of the arms 44 is operatively connected to a hydraulic cylinder 72 or the like for moving the arms 44 and the assemblies connected thereto in the axial direction A. The cylinders 72 move the screens 36 upwardly at about the same rate that the pulp within the vessel 20 is moved upwardly, until the screens 36 attain the upwardmost limit of their travel, then the cylinders 72 rapidly move the assemblies downwardly (i.e. in ⅛-¼ sec.) in order to free the screens 36 of pulp adhering to the perforated side plates 38 thereof. A reverse flow from the interior of the screens 36 may also be provided for an instant to assist in unclogging the plates 38, as by a pressure source (not shown) associated with suction source 40 or the like. Since strong torsion and bending force resisting connections are provided between the screens 36 and arms 44 according to the present invention, it is possible to provide only three arms 44, instead of a larger number (i.e. 6) as was necessary according to the prior art, without lessening the life of the structure, or interfering with the even transfer of fluid across the side plates 38 of screens 36. Utilization of three arms 44 as opposed to a larger number has the advantage of minimizing the adverse effects of non-synchronous operation of the cylinders 72 connected to the arms 44. Since completely synchronous operation of the cylinders 72 is virtually impossible, stresses are introduced on the arms 44 and the rest of the assembly by the small differences in movement of various portions of the assembly. The shape of an elastic object supported at three points (three arms) does not depend on the exact level of the supports, therefore three arms 44 are utilized according to the present invention, and subsequently stresses resulting from non-synchronous operation of the cylinders 72 are avoided.

The whole screen-arm-header assembly is preferably made of metal, such as carbon steel, stainless steel or titanium depending on the chemical environment inside of vessel 20.

According to the present invention, any number of concentric screens 36 and headers 46 may be provided, arranged in any number of tiers within the vessel 20. Only one set of screens 36 may be connected to headers 46, with the respective side plates 38 and 52 thereof in end-to-end relationship, or as shown in the drawings, screens may be connected to both ends of the headers 46. The same attaching means are generally utilized for connecting each set of screens 36 to a set of headers 46.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An assembly for processing pulp and the like in a vessel, said assembly comprising
   (a) a plurality of concentric ring-shaped screens, each screen having a pair of apertured side plates radially spaced from each other;
   (b) a plurality of concentric ring-shaped headers, each header having a pair of substantially solid side plates radially spaced from each other;
   (c) means for connecting each of said ring-shaped headers to a corresponding ring-shaped screen so that said side plates of said screen and said header are generally in straight-line end-to-end relationship, and so that each said connected screen and header are in fluid communicating relationship;
   (d) a central core located at the center of said concentric rings and headers;
   (e) a plurality of radially-extending arms, each extending from said core through each of said headers to a peripheral location and each including a pair of spaced side walls, a top portion, and a bottom portion;
   (f) means for connecting said headers to said arms so that bending and torsional rigidity are provided and for providing fluid communication between said arms and said headers, said means comprising pair of torsion bars, one torsion bar disposed on either side of said arm side walls, and means for attaching said top and bottom portions of said arm to said torsion bars; and
   (g) means positioned at said peripheral locations for reciprocating said arms and said headers and screens attached thereto in an axial direction.

2. An assembly as recited in claim 1 wherein said torsion bars have a plurality of openings formed therein for providing fluid communication between said arm and the header to which it is connected.

3. An assembly as recited in claim 2 wherein said header-arm connecting means further includes a fitting connected between one of said arm top and bottom portions and said means for connecting said screens and header together.

4. An assembly as recited in claim 2 wherein said means for connecting each of said headers and screens together includes a generally flat ring member having a width generally corresponding to the spacing between the side plates of the respective screen and header, and having a plurality of openings disposed therein for providing fluid communication between said screen and said header, and means for connecting said ring member to said screen and said header.

5. An assembly for processing pulp and the like in a vessel, said assembly comprising
   (a) a plurality of concentric ring-shaped screens, each screen having a pair of apertured side plates radially spaced from each other;
   (b) a plurality of concentric ring-shaped headers, each header having a pair of substantially solid side plates radially spaced from each other;
   (c) means for connecting each of said ring-shaped headers to a corresponding ring-shaped screen so that said side plates of said screen and said header are generally in straight-line end-to-end relationship, and so that each said connected screen and header are in fluid communicating relationship;
   (d) a central core located at the center of said concentric rings and headers;
   (e) exactly three radially-extending arms, each extending from said core through each of said headers to a peripheral location, and each including a pair of spaced side walls, top portion, and a bottom portion;
   (f) means for connecting said headers to said arms so that bending and torsional rigidity are provided and for providing fluid communication between said arms and said headers, said means comprising a pair of torsion bars, one torsion bar disposed on either side of said arm side walls, and means for attaching said top and bottom portions of said arm to said torsion bars;

(g) a hydraulic cylinder positioned at said peripheral locations for reciprocating said arms and said headers and screens attached thereto in an axial direction; and (h) a plurality of axially extending rotatable spray tubes for spraying liquid in an area between concentric screens.

6. An assembly as recited in claim 5 wherein said torsion bars have a plurality of openings formed therein for providing fluid communication between said arm and the header to which it is connected.

7. An assembly as recited in claim 6 wherein said header-arm connecting means further includes a fitting connected between one of said arm top and bottom portions and said means for connecting said screens and header together.

8. An assembly as recited in claim 6 wherein said means for connecting each of said headers and screens together includes a generally flat ring member having a width generally corresponding to the spacing between the side plates of the respective screen and header, and having a plurality of openings disposed therein for providing fluid communication between said screen and said header, and means for connecting said ring member to said screen and said header.

9. In an assembly for processing pulp and the like a connecting means between a ring-like screen and a radially extending arm, the arm including spaced side plates and a top portion and a bottom portion, for providing fluid communication between the interior of the screen and the arm, said connecting means comprising a ring-like header having substantially the same ring diameter as said ring-like screen, first attaching means for attaching said header to said screen, both said screen and said header having radially spaced side plates and said respective side plates being disposed in fluid-communicating end-to-end relationship, second attaching means for attaching said header to said radially extending arm so that bending and torsional rigidity are provided and for providing fluid communication between said arm and said header, said second attaching means comprising a pair of torsion bars, one disposed on either side of said arm side plates;

third attaching means for attaching each of said torsion bars to said first attaching means; and fourth attaching means for attaching said torsion bars to said arm top and bottom portions.

10. In an assembly as recited in claim 9 wherein said torsion bars each have a plurality of openings formed therein for providing fluid communication between said arm and said header.

11. In an assembly as recited in claim 10 wherein said first attaching means includes a generally flat ring member having a width generally corresponding to the spacing between the side plates of each of the screen and header, and having a plurality of openings disposed therein for providing fluid communication between said screen and said header, and fifth attaching means for attaching said ring member to said screen and said header.

12. In an assembly as recited in claim 9 wherein said second attaching means further includes a fitting connected between one of said arm top and bottom portions and said first attaching means.

* * * * *